United States Patent
Pearce

(10) Patent No.: US 6,308,272 B1
(45) Date of Patent: Oct. 23, 2001

(54) SECURITY SYSTEM USING EXISTING NETWORK AND PERSONAL COMPUTERS

(75) Inventor: Jerry W. Pearce, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/217,870

(22) Filed: Dec. 21, 1998

(51) Int. Cl.[7] .......................... G06F 11/30; G06F 15/173
(52) U.S. Cl. ...................... 713/200; 709/224; 340/568.2
(58) Field of Search .......................... 379/47; 340/568.2, 340/539, 686.1, 506, 507, 568.1; 348/156; 709/226, 229, 224, 225; 713/200, 201, 202; 700/21, 79, 80

(56) References Cited

U.S. PATENT DOCUMENTS

| | | | |
|---|---|---|---|
| 5,287,519 | * | 2/1994 | Dayan et al. .......................... 713/202 |
| 5,675,321 | * | 10/1997 | McBride ............................. 340/568.2 |
| 5,793,840 | * | 8/1998 | Zhuang et al. .......................... 379/47 |
| 5,861,804 | * | 1/1999 | Fansa et al. .......................... 340/539 |
| 5,945,915 | * | 8/1999 | Cromer et al. ...................... 340/686.1 |
| 6,002,427 | * | 12/1999 | Kipust .................................. 348/156 |
| 6,151,678 | * | 11/2000 | Davis ................................... 713/200 |

FOREIGN PATENT DOCUMENTS 2 262 372 A * 6/1993 (GB).
WO 98/25243 A1 * 6/1998 (WO).

OTHER PUBLICATIONS

AMD white paper, AMD's AlertIT Technology for Advanced Systems Management, Dec. 1998, 5 pages.*

* cited by examiner

Primary Examiner—Patrice L. Winder
(74) Attorney, Agent, or Firm—George E. Grosser; Andrew Dillon

(57) ABSTRACT

A security system using a security detector associated with a personal computer attached to an existing data transmission network, where the personal computer is effective to detect security breaches and transmit an alarm even if the personal computer is not in its operating mode. When a security breach is detected by the security detector, the data transmission network is used to report the incident to a monitoring station for appropriate logging and action. Because the security system is coupled to a data transmission network and computer resources, the security system can be remotely activated and can respond to historical sensing of a security detector to adjust its threshold.

19 Claims, 4 Drawing Sheets

SECURITY SYSTEM USING EXISTING NETWORK AND PERSONAL COMPUTERS

CROSS REFERENCE TO RELATED PATENTS

The present invention is related to Ser. No. 09/024,231 filed Feb. 17, 1997 by inventors: Daryl Cromer, Howard Locker, David Rhoades and James Ward entitled, "Full Time Network Auxiliary for a Network Connected PC", and assigned to the assignee of the present invention. This patent is specifically incorporated herein by reference and is sometimes referred to as the "LAN Patent"

FIELD OF THE INVENTION

The present invention relates to providing security through the use of existing personal computers and data transmission networks in a building. More particularly, the present invention involves attaching security devices such as motion detectors to a personal computer which has some data processing capabilities even when it is in its non-operational mode.

BACKGROUND OF THE INVENTION

Security of their business premises is important to companies, especially for those companies which have personal computers. The personal computers are becoming smaller and more easily portable (particularly laptop computers and network computers) at the same time that personal computers are providing an increasing amount of data processing to the desktop of the individual worker. Each personal computer is expensive in initial hardware costs, with software and service costs adding to the value of the personal computers, and personal computers store an increasing amount of data for a typical business organization. Loss of any of the personal computers would represent a loss of an investment as well as a decrease in the productivity of the business operation, in some cases reducing substantially the productivity of a worker.

While some businesses are operated around the clock every day, many are operated only part of the time, with the rest of the time, the facilities are expected to be idle. This idle time provides a risk, since the absence of authorized personnel implies an opportunity for devious (criminal) activity because no one is watching. This devious or criminal activity could range from stealing either equipment or data or altering the data to make it unusable or unreliable. Such devious or criminal activity can result from a person, either an employee or a visitor or even a stranger, getting into an area where the people are otherwise not present, as after normal working hours. It would desirable to detect the presence of an intruder after normal business hours so that the security can investigate and take appropriate steps to remove an inappropriate visitor.

Of course, one way to monitor premises for visitors in places where they aren't supposed to be at times when they are not supposed to be there is to install a security system of either cameras or motion detectors in the region, then monitor those devices for improper activity. But, a security system normally involves running new cables to attach the sensor devices such as motion detectors or cameras to a central monitoring station. Such cabling is expensive to run and may be the subject of additional requirements such as building codes and require a building permit to install.

It would be desirable to use the personal computers which are in place to assist in providing monitoring, but the personal computers are typically in their operational mode only during the normal working hours and are turned to non-operational mode when the working day ends, making it difficult to use the personal computers in monitoring of after-hours activities on the business premises. Further, leaving the personal computers in their operational mode would have disadvantages, both in terms of power consumption and in terms of device life, particularly the life of the monitor attached to the personal computer, where the coatings on the screen tend to degrade as the monitor accumulated hours of operation, a reason that "screen savers" have come into use to reduce the amount of deterioration of the coatings on the monitor.

Security devices may be operated individually or using remote communications techniques, but these are usually suitable only for small systems or line-of-sight applications. Each sensor in a security system could include its own visual or audible alarm, a system which would work well if the monitoring station could see or hear all the locations. The security system could communicate over infrared communications if the sensor and the receiver were in a line of sight relationship. A security system could communicate using radio or cell phone communications if the system had enough capabilities without becoming too expensive.

Other limitations and disadvantages of the prior art systems for providing security of premises will be apparent to those skilled in the relevant arts.

SUMMARY OF THE INVENTION

The present invention overcomes the limitations and disadvantages of the prior art systems by providing a security device (e.g., a motion detector) coupled to a personal computer, which, even when the personal computer is in its non-operational mode, still can communicate with a data transmission network to provide an alert when the security device is triggered by a security incident (e.g., motion above a threshold).

The present invention avoids the need for new cabling by using the existing cabling of a data transmission network to which the personal computers are already attached and through which the attached personal computers communicate.

The present invention has the advantageous feature that the personal computers need not be in their operational mode but, even in their non-operational mode, can communicate with a monitoring station over a data transmission network to report a security incident.

The present invention also has the advantageous feature that allows for the security devices to be monitored remotely and turned on and off remotely, either manually or in response to predetermined parameters, like time of day.

The security devices of the present invention have the advantage that, since they are coupled to a personal computer where the past historical activity can be recorded and analyzed, the historical activity of the security device can be considered in setting the thresholds at which the security device sets off an alarm.

The present invention has the advantage that, since different security devices are attached to different personal computers, each personal computer can be set individually to provide a different threshold and a different activation period for the security devices. That is, one security device may be present in an area which has personnel normally close by while another personal computer and security device may be in an area in which no personnel are expected to be close. Also, one area may inherently have greater background activity (noise) than another, such as an open area or an area adjacent a fan, open window or an opening for heating and cooling while another security device may be in an area which is closed and still.

The foregoing and other objects and advantages will be apparent to those skilled in the relevant art in view of the following detailed description of the preferred embodiment, taken together with the appended claims and the accompanying drawings.

BRIEF DESCRIPTION OF THE DRAWINGS

The foreground aspects and other features of the present invention are explained in the following written description, taken in connection with the accompanying drawings, wherein.

DETAILED DESCRIPTION OF THE PREFERRED EMBODIMENT

The following detailed description is of the best presently-contemplated mode for carrying out the invention. This description is not to be taken in a limiting sense but is made merely for the purpose of illustrating the general principles of the present invention since the scope of the invention is best defined in the appended claims.

Figure 1:
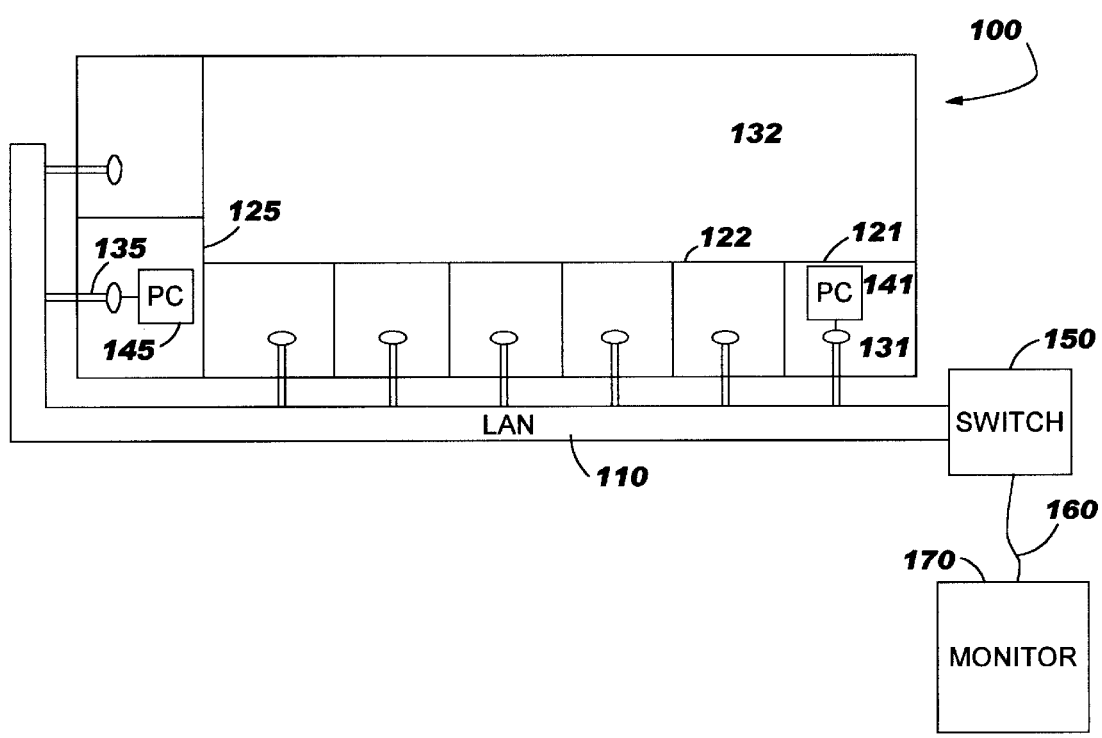
FIG. 1 is a floor plan of an office layout with a data transmission network and personal computers attached thereto.

FIG. 1 illustrates a floor plan of at least a portion of an office building or other facility 100. A local area network (or LAN) 110 is wired into a relevant portion of the building to provide a data transmission network using a data communications protocol which may be one of the conventional communication systems (like token ring or Ethernet) or a proprietary network. Modern office buildings are either built wired for such communications through existing walls and/or ceiling apertures or conduits for such communications have been installed to facilitate communications among the office.

As shown in FIG. 1, the office building includes a plurality of separate offices 121, 122, 125 (and others, not specifically numbered) with at least some of the offices including plugs 131, 132, 135 for bringing a connection to the local area network to the various offices 121, 122, 125, respectively. Personal computers 141, 145 are coupled to the plugs 131, 141 to provide the respective personal computers a connection to the local area network or data transmission network in a conventional manner. The local area network or data transmission network 110 is coupled in a conventional manner to a network switch 150 which may be of conventional design for receiving and transmitting data from a conventional network, preferably in the form of a router which is of standard design. The switch 150 is coupled to a monitoring station 170 in a conventional manner, the details of which are determined by the distance between the network 110 and the monitor 170. If the monitor 170 is in the same building as the network 110, then it would be typical for the two to be connected by conventional cabling. However, there may be considerable distance (even many miles) between the office building 100 and the monitoring station, in which case the communication would be through either a telephone network or a satellite communications, both of which are well known and may be of conventional design, the details of which are not particularly relevant to the present invention.

Each computer has a unique address. Messages from the PC include this address so that the source of a message can be identified. A database can be used to cross references the address to the physical location of the computer.

Figure 2:
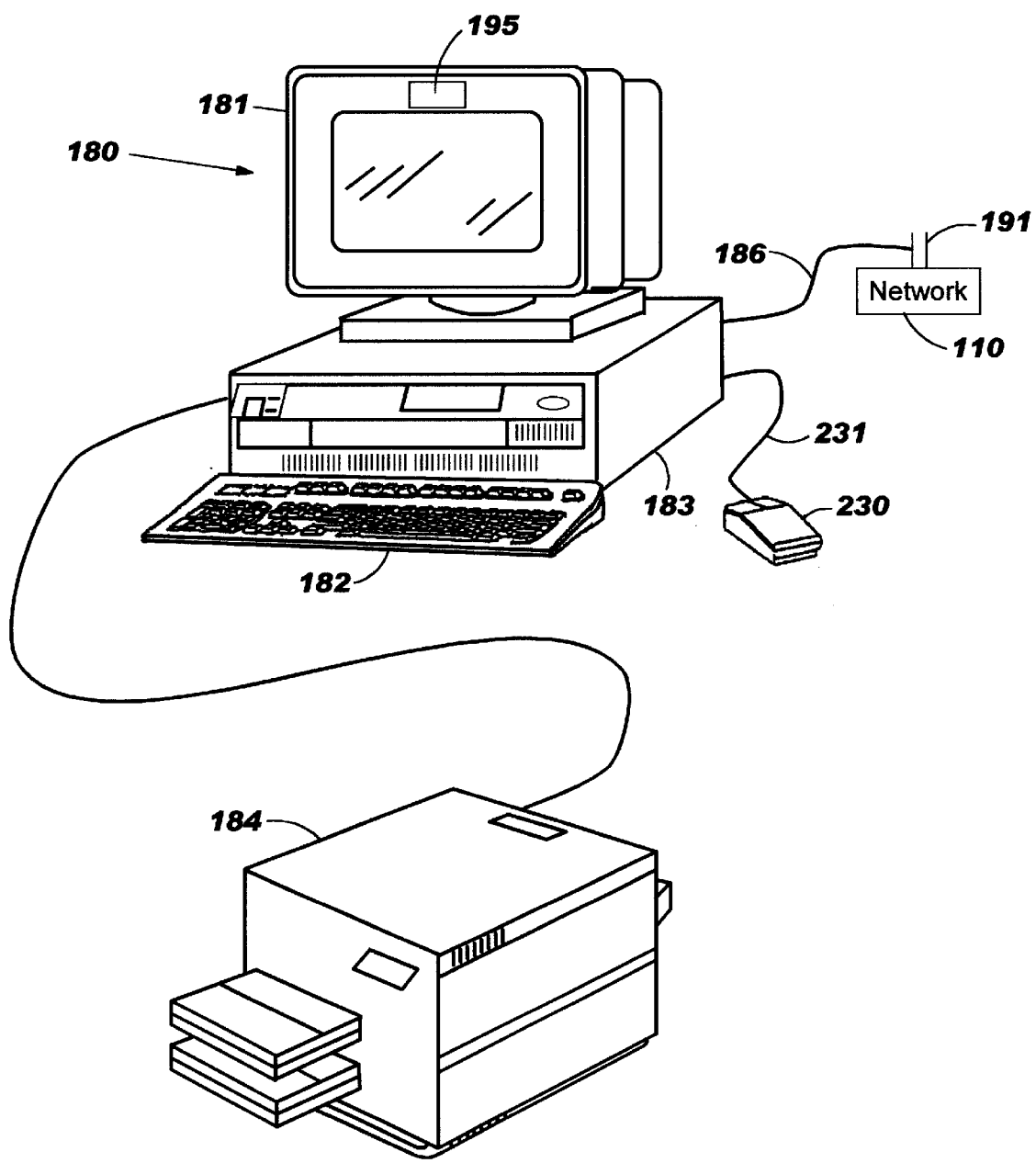
FIG. 2 is a perspective view of a personal computer employing the present invention.

As shown in FIG. 2, a personal computer 180 is shown which, except for differences to be described later, is rather conventional. The personal computer 180 includes a display monitor 181 and a keyboard 182 coupled to a system unit 183 with a mouse 230 coupled by wire 231 to the system unit 183. An optional printer 184 is also attached to the system unit 183. A cable 186 from the system unit 183 connects the personal computer 180 to the local area network 110 through a conventional plug 191.

The personal computer 180 includes a system unit 183 which has the characteristics described in connection with the reference above in the section entitled "Cross Reference to Related Patents". Notable among these characteristics is that the system unit 183 includes a main processor which has a normal operational mode and a non-operational mode (which might be called a "turned-off" mode) in which the main processor and the display are not powered and during which the keyboard 182 and the mouse 230 may be non-operational also. The system unit 183 also includes a secondary or service processor (not illustrated in this view), with the secondary or service processor being operational even when the main processor is in its non-operational mode as described in the Patent (and available in the IBM Intellistation M Pro workstation). As described in that patent, this feature allows the personal computer 180 to provide some functioning capability even when the personal computer 180 is in its non-operational mode, as it may well be during the time when workers are not present in the office.

Coupled to the personal computer in an operative manner is a motion detector 195, shown as a window in a top portion of the display monitor 181. This motion detector 195 is quite similar functionally to a sensor which is incorporated into a light housing for turning lights on in response to detected motion. One such detector is the sensor in Model D38ESP form Microwave sensors Inc. of an arbor, MI and another is described in U.S. Pat. No. 5,717,203. In response to motion, an electrical signal (voltage and current) is produced which triggers a response (in the case of the motion detector in the light assembly, the lights are turned on by a diode or transistor action). The motion detector may be mounted to the office in any way and may or may not be a physical part of the existing personal computer, as may be dictated by the presence or absence of space to mount the sensor within the components of the personal computer and whether the sensor is compatible with the adjacent components (in terms of heat and electromagnetic radiation from one devices which may influence the adjacent component.)

Figure 3:
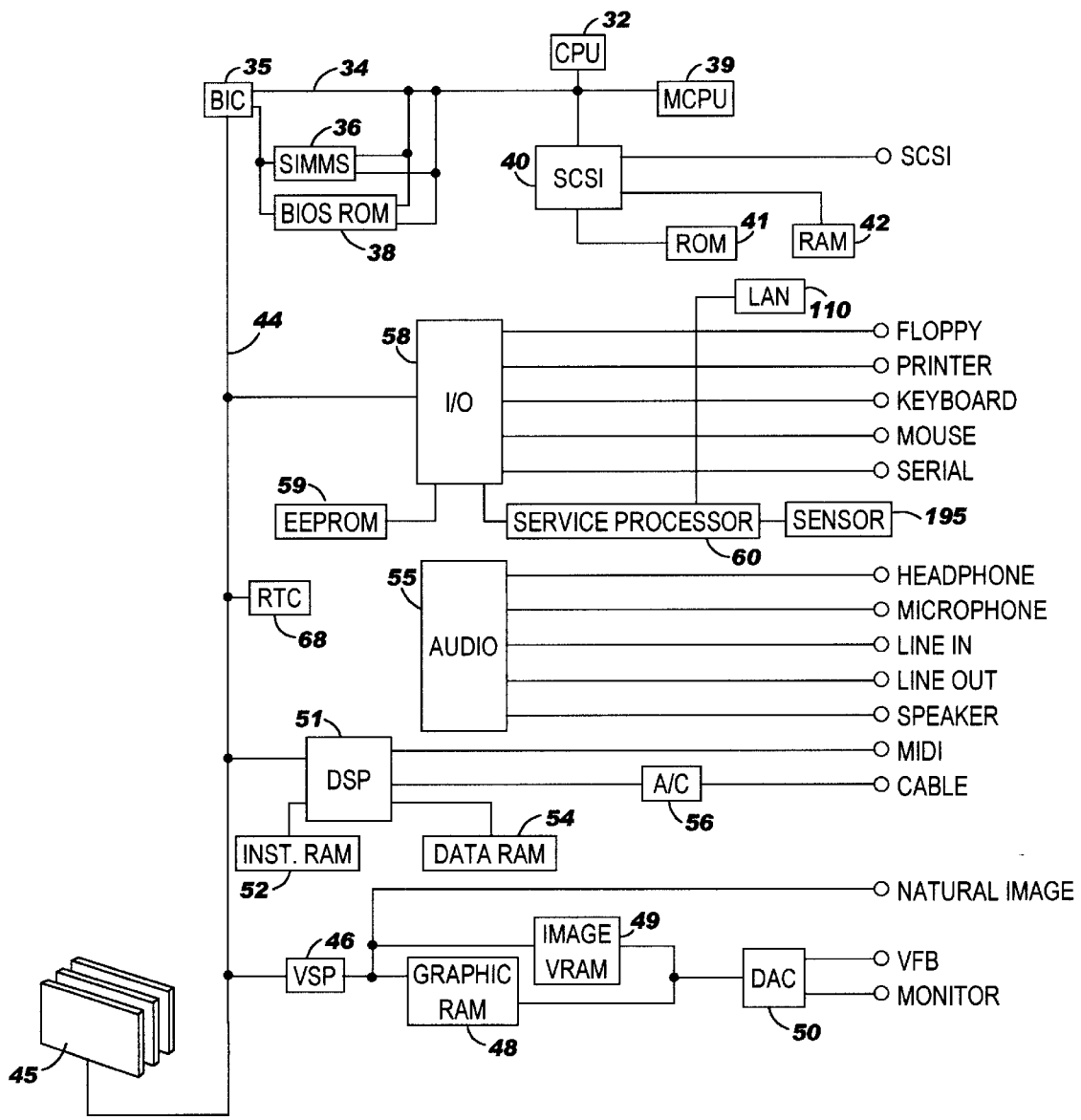
FIG. 3 is a system block diagram of selected components of the personal computer of FIG. 2.

As shown in FIG. 3, a conventional personal computer of the type described in U.S. Pat. No. 5,574,786. In addition, according to a preferred implementation for the invention, the service processor 60 is coupled to the sensor 195 and receives signals therefrom. The service processor 60 is also coupled to the data transmission network 110 to provide two-way communication between the network 110 and the personal computer 180.

Figure 4:
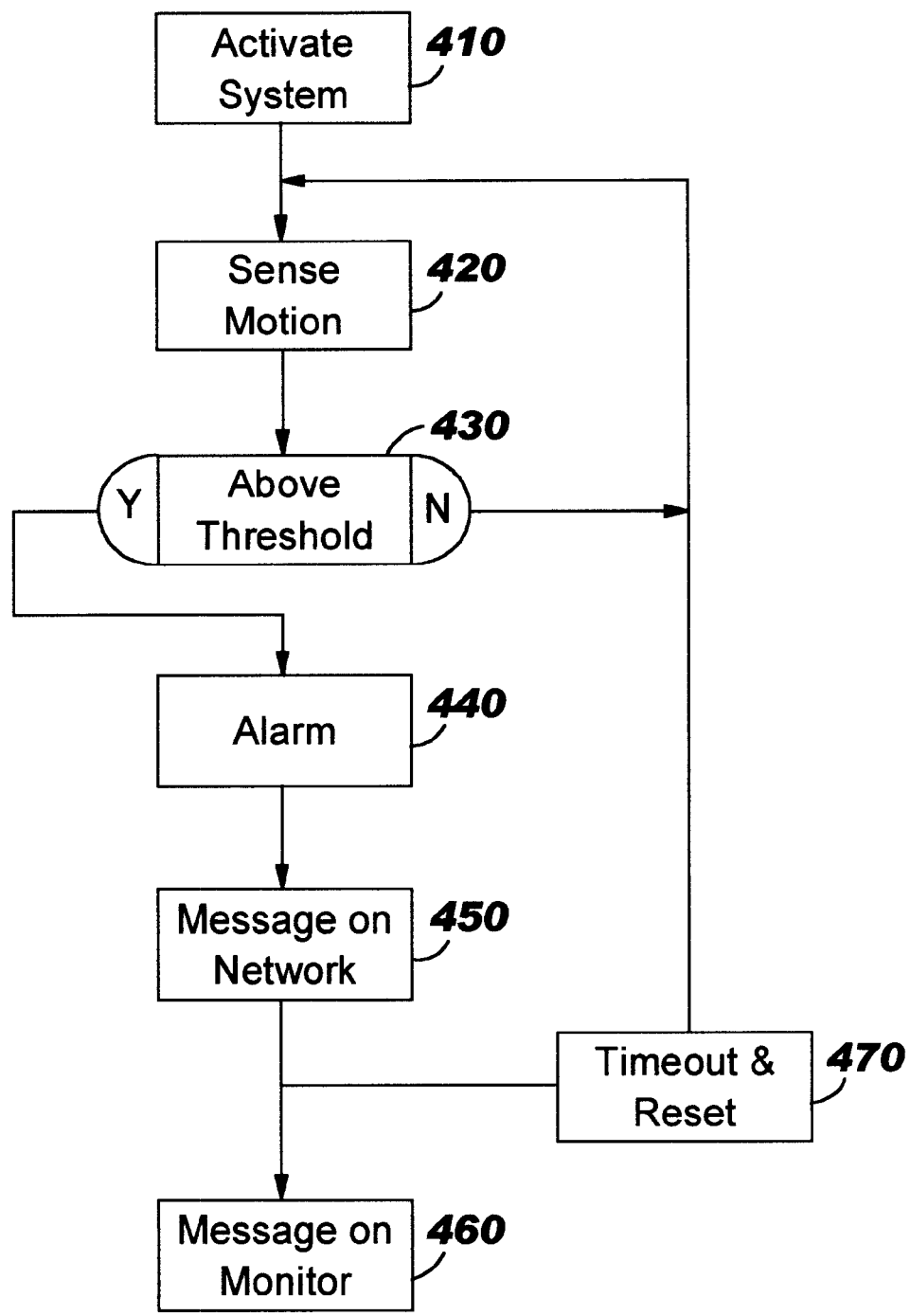
FIG. 4 is a flow chart of the security system of the present invention.

This communications allows the steps of the flow chart of FIG. 4 to be carried out, preferably in the service processor 60. The first step 410 is to activate the security system, in effect to turn the sensor on. This can be done remotely from the monitor 170 or from the service processor, either based on a determination that monitoring is desired, based on the time of day (where a preset algorithm is stored and executed, for example, that motion is detected and reported during the hours of midnight until 6:00 a.m. Or on weekends), or it could be that security is invoked when little motion is detected during a preset period of time (for example, an hour, indicating that people have left either the entire building or the particular office).

Once the system is activated, then the sensing of motion causes an electrical signal to be sent at block 420. This sensed motion, in the form of an electrical signal, probably in the form of an analog signal, is compared with a threshold at the block 430. The threshold can either be preset or can be based on historical values and may change with time, so when people are expected in nearby offices and corridors, a higher threshold may be appropriate and when the premises are expected to be empty, then a lower threshold may be established. Also, if some offices have inherent sources of motion (a fan, moving machinery or other moving objects) or are adjacent pathways where personnel are expected to pass by, a higher threshold may be set than if the monitor is of a private office which is expected to be unattended. The threshold may be based solely on amplitude or may be a combination of amplitude and duration.

Once the sensor detects a motion which is above whatever the threshold, an alarm is activated at the block 440 and a message is put on the network at block 450. This message, which advantageously includes the address of the personal computer as well as details of the security incident such as the date/time and a reading indicative of the amount of motion sensed, is put on the network is then presented to the monitor station 170 for appropriate action (investigation, calling a security team, etc.) and recorded. After a preset time period at the block 470, the system is reset and any further alarms (additional motion, for example) will result in additional alarms being recorded and transmitted to the monitoring station 170.

The beauty of this system is that the existing data transmission network to which personal computers are already attached, is used for the security system. The security system also uses the existing personal computers, even if they are in their nonfunctional role, and the need for additional hardware is limited to a rather conventional and inexpensive motion sensor or other similar security monitor(s).

Many modifications and adaptations to the preferred embodiment are, of course, possible without departing from the spirit of the present invention. While the security monitoring device has been disclosed in the form of a motion detector, other detectors such as proximity or infrared or temperature detectors could be used to advantage in appropriate circumstances, as could sensors to detect the opening or closing of contacts. It is also possible to use some of the features of the present invention to advantage without the corresponding use of other features. The feature of adjusting the threshold based on historical data might be more useful in some applications than others; in some, it could be dispense with altogether without departing from the spirit of the present invention.

Accordingly, the foregoing description of the preferred embodiment should be considered as merely illustrative of the principles of the present invention and not in limitation thereof, since the invention is defined solely by the following claims.

Having thus described the invention, what is claimed is:

1. A security system for transmitting an alarm when a security threshold is exceeded, said security system mounted to an existing data transmission network with a personal computer having a main processor attached thereto and comprising:

a security monitoring device coupled through the personal computer to the data transmission network, said security monitoring device providing an output which is related to a detected security parameter;

means within the personal computer for storing a threshold for the detected security parameter of the security device;

a sensor within the personal computer for transmitting an alarm through the data transmission network when the detected parameter of the security device exceeds the stored threshold even if the personal computer is in its non-operational state, said sensing means within the personal computer including a secondary processor which is operational even when the personal computer is in its non-operational state, whereby an alarm is transmitted when the secondary processor detects that the output of the security device exceeds the stored threshold.

2. A security system of the type described in connection with claim 1 wherein the security monitoring device includes means for detecting motion.

3. A security system of the type described in connection with claim 2 wherein the personal computer further includes means for identifying itself to the data transmission network and, upon sensing an alarm, transmits identification information along with the details of the alarm.

4. A security system of the type described in connection with claim 3 wherein the security system further includes a monitoring station and means for setting security parameters.

5. A method of detecting and reporting a security incident in a building including a data transmission network and at least one personal computer having a main processor attached thereto, the method comprising the steps of:

coupling a security detector to the personal computer;

sensing, at the security detector, a security parameter which indicates the relative security of the area around the security detector;

comparing, in the personal computer, the detected parameter with a threshold stored in the personal computer even if the personal computer is in an non-operational state and wherein the personal computer includes a secondary processor that is operational even when the personal computer is in its non-operational state; and when the detected parameter exceeds the threshold, generating an security alarm and transmitting the security alarm over the data transmission network to a remote monitoring location.

6. A method of detecting and reporting a security incident of the type described in claim 5 further including the step of activating a security feature of the personal computer and the security detector to provide security only during selected periods of time.

7. A method of detecting and reporting a security incident including the steps of claim 6 where the step of activating the security feature of the personal computer and the security detector to provide security during a selected period of time includes the step of transmitting a message from the remote monitoring station to activate the personal computer and its security detector.

8. A method of detecting and reporting a security incident including the steps of claim 6 wherein a plurality of personal computers are coupled to the data transmission network and the step of activating one of the plurality of personal computers includes the step of addressing the one of the plurality of personal computers and providing a threshold for the security parameter for the one personal computer.

9. A method of detecting and reporting a security incident including the steps of claim 6 wherein the step of activating the personal computer includes identifying a personal computer to be activated and setting a threshold for the security feature of the personal computer to be activated, with at least one of the activating and setting steps being performed by transmitting a message over the data transmission network to the personal computer.

10. A method of detecting and reporting a security incident including the steps of claim 9 wherein the steps of activating the security feature of the personal computer and setting the threshold for the security parameter are transmitted to the personal computer over the data transmission network.

11. A method of detecting and reporting a security incident including the steps of claim 10 wherein the steps of activating the security feature of the personal computer and setting the threshold are accomplished by transmitting a signal from the remote monitoring location to the personal computer.

12. A security system for sensing and reporting security incidents over an existing data transmission network in a building, the system comprising:
    a first computer and a second computer, each having a main processor and coupled to the data transmission network for communicating security information, said first and second computers each including a secondary processor which is operational when operators are not using the computer so that the computers provide security even when the operators are not using the computers;
    a security threshold stored in each of the first and second computers;
    a security sensor for generating a security signal based upon security activity and coupled to the processor in each of the first and second computers, the secondary processor including a to comparator to compare the signal based upon the security activity with the stored threshold in the computer and provide an alarm when the security signal exceeds the threshold.

13. A security system of the type described in claim 12 wherein the alarm is transmitted to a remote monitoring location over the data transmission network along with an identification of the personal computer sending the alarm.

14. A security system of the type described in claim 13 wherein the remote monitoring station transmits a signal over the data transmission network to a selected personal computer to activate its security role.

15. A security system of the type described in claim 13 wherein the remote monitoring station transmits a signal over the data transmission network to a selected personal computer where the signal includes the threshold for the selected personal computer.

16. A security system of the type described in claim 15 wherein the threshold for the selected personal computer is based on the previous security signals sensed at the selected personal computer.

17. A network for providing security throughout a security area during selected time periods by sensing a security indicator and provide an alarm when the security value exceeds a stored threshold, the system comprising:
    one or more computers each having a main processor and a monitoring station, said one or more computers located within the security area, with both the computers and the monitoring station coupled to a data transmission network, the computers each including a secondary processor which remains active during the selected time periods;
    a security sensor coupled to each computer processor and providing a security value based on its sensed security indicator;
    a security threshold associated with each personal computer; and
    the secondary processor in each personal computer including a comparator comparing the sensed security value with the threshold and providing an alarm when the sensed security value exceeds the threshold.

18. A security system for monitoring motion in an area and providing an alarm on a data transmission network when the motion exceeds a threshold, the system comprising:
    a personal computer having a main processor, said personal computer located within the area and coupled to the data transmission network, said personal computer including a secondary processor that is operational even when the personal computer is in its non-operational state;
    a motion detector coupled to the personal computer for generating a signal based on the motion in the area sensed by the motion detector;
    a threshold stored within the personal computer and a comparator within the personal computer for comparing the signal indicative of motion in the area with the stored threshold and generating an alarm when the signal indicative of motion exceeds the stored threshold; and
    a monitoring station coupled to the data transmission network for receiving and storing the alarm indicating that motion at the personal computer exceeds the stored threshold.

19. A security system of the type described in claim 18 wherein the system includes a plurality of personal computers located within the area to be monitored, each of the personal computer having a stored threshold and each coupled to the data transmission network for generating an alarm when the signal generated based on sensed motion exceeds the threshold stored in the respective computer.

* * * * *